(12) United States Patent
Boyer et al.

(10) Patent No.: US 10,390,680 B2
(45) Date of Patent: Aug. 27, 2019

(54) ONE-WAY CLUTCH

(71) Applicant: Haier US Appliance Solutions, Inc., Wilmington, DE (US)

(72) Inventors: Joel Charles Boyer, Louisville, KY (US); John Edward Dries, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 219 days.

(21) Appl. No.: 15/441,387

(22) Filed: Feb. 24, 2017

(65) Prior Publication Data

US 2018/0242815 A1    Aug. 30, 2018

(51) Int. Cl.
| | |
|---|---|
| *A47L 15/42* | (2006.01) |
| *A47L 15/23* | (2006.01) |
| *A47L 15/50* | (2006.01) |
| *A47L 15/46* | (2006.01) |
| *F16D 41/063* | (2006.01) |
| *F16D 41/066* | (2006.01) |

(52) U.S. Cl.
CPC .......... *A47L 15/4225* (2013.01); *A47L 15/23* (2013.01); *A47L 15/4202* (2013.01); *A47L 15/4293* (2013.01); *A47L 15/46* (2013.01); *A47L 15/502* (2013.01); *A47L 15/507* (2013.01); *F16D 41/063* (2013.01); *F16D 2041/0665* (2013.01)

(58) Field of Classification Search
None
See application file for complete search history.

(56) References Cited

U.S. PATENT DOCUMENTS

| | | | | |
|---|---|---|---|---|
| 2,912,086 | A | | 11/1959 | Troendly et al. |
| 2,913,930 | A | * | 11/1959 | Hellyer .................. A47L 15/06 192/105 BA |
| 5,771,719 | A | * | 6/1998 | Moon ..................... D06F 17/06 68/183 |
| 2016/0206174 | A1 | * | 7/2016 | Dries .................. A47L 15/4202 |

FOREIGN PATENT DOCUMENTS

CN    2351081 Y    12/1999

* cited by examiner

*Primary Examiner* — Jason Y Ko
*Assistant Examiner* — Cristi J Tate-Sims
(74) *Attorney, Agent, or Firm* — Dority & Manning, P.A.

(57) ABSTRACT

A fluid circulation assembly for a dishwasher appliance includes a motor with a drive shaft rotatably coupled to the motor. An impeller is coupled to the drive shaft with a one-way clutch. The one-way clutch includes a housing integrally formed in the impeller and a bearing disposed within the housing. The bearing is movable within the housing between a first position and a second position. The bearing is spaced from the drive shaft in the first position, and the bearing operatively engages the housing and the drive shaft to transfer rotational motion from the drive shaft to the impeller in the second position.

20 Claims, 10 Drawing Sheets

ONE-WAY CLUTCH

FIELD

The present subject matter relates generally to one-way clutches which may be used in wet environments including dishwasher appliances.

BACKGROUND

Dishwasher appliances generally include a tub that defines a wash chamber. Rack assemblies can be mounted within the wash chamber of the tub for receipt of articles for washing. Wash fluid (e.g., various combinations of water and detergent along with optional additives) may be introduced into the tub where it collects in a sump space at the bottom of the wash chamber. During wash and rinse cycles, a circulation or wash pump may be used to pump wash fluid to spray assemblies within the wash chamber that can apply or direct wash fluid towards articles disposed within the rack assemblies in order to clean such articles. A drain pump may periodically discharge soiled wash fluid that collects in the sump space and the process may be repeated.

Conventional dishwasher appliances use two separate motors to operate the wash pump and the drain pump. However, additional motors take up more space, add cost, and require additional seals, thus increasing the likelihood of leaks and decreasing appliance reliability.

Accordingly, a dishwasher appliance that utilizes a single motor and common drive shaft to rotate a wash pump and a drain pump while reducing the likelihood of leaks would be useful.

BRIEF DESCRIPTION

A fluid circulation assembly for a dishwasher appliance includes a motor with a drive shaft rotatably coupled to the motor. An impeller is coupled to the drive shaft with a one-way clutch. The one-way clutch includes a housing integrally formed in the impeller and a bearing disposed within the housing. The bearing is movable within the housing between a first position and a second position. The bearing is spaced from the drive shaft in the first position, and the bearing operatively engages the housing and the drive shaft to transfer rotational motion from the drive shaft to the impeller in the second position. Additional aspects and advantages of the invention will be set forth in part in the following description, or may be obvious from the description, or may be learned through practice of the invention.

In one aspect of the present disclosure, a fluid circulation assembly is provided. The fluid circulation assembly includes a motor with a drive shaft rotatably coupled to the motor. The drive shaft defines an axial direction, a radial direction, and a circumferential direction, and the drive shaft extends along the axial direction out of the motor. An impeller includes a central hub and a plurality of impeller blades extending outwardly from the central hub along the radial direction. The impeller is coupled to the drive shaft with a one-way clutch. The one-way clutch includes a housing formed of a unitary and seamless construction with the central hub and a bearing disposed within the housing. The bearing is movable within the housing between a first position and a second position. The bearing is spaced from the drive shaft in the first position, and the bearing operatively engages the housing and the drive shaft to transfer rotational motion from the drive shaft to the impeller in the second position. The bearing moves to the first position to disengage the drive shaft and the impeller such that the drive shaft rotates freely within the impeller when the drive shaft rotates in a first direction and the bearing moves to the second position to engage the drive shaft and the impeller to transfer rotational movement from the drive shaft to the impeller when the drive shaft rotates in a second direction opposing the first direction.

In another aspect of the present disclosure a dishwasher appliance is provided. The dishwasher appliance defines a vertical direction, a lateral direction, and a transverse direction that are mutually perpendicular. The dishwasher appliance includes a tub defining a wash chamber for receipt of articles for washing with a sump positioned at a bottom of the wash chamber for receiving fluid from the wash chamber. The dishwasher appliance also includes a filter at least partially disposed within the sump and a fluid circulation assembly disposed within the sump and surrounded by the filter. The fluid circulation assembly includes a motor with a drive shaft rotatably coupled to the motor. The drive shaft defines an axial direction, a radial direction, and a circumferential direction, and the drive shaft extends along the axial direction out of the motor. An impeller includes a central hub and a plurality of impeller blades extending outwardly from the central hub along the radial direction. The impeller is coupled to the drive shaft with a one-way clutch. The one-way clutch includes a housing formed of a unitary and seamless construction with the central hub and a bearing disposed within the housing. The bearing is movable within the housing between a first position and a second position. The bearing is spaced from the drive shaft in the first position, and the bearing operatively engages the housing and the drive shaft to transfer rotational motion from the drive shaft to the impeller in the second position. The bearing moves to the first position to disengage the drive shaft and the impeller such that the drive shaft rotates freely within the impeller when the drive shaft rotates in a first direction and the bearing moves to the second position to engage the drive shaft and the impeller to transfer rotational movement from the drive shaft to the impeller when the drive shaft rotates in a second direction opposing the first direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
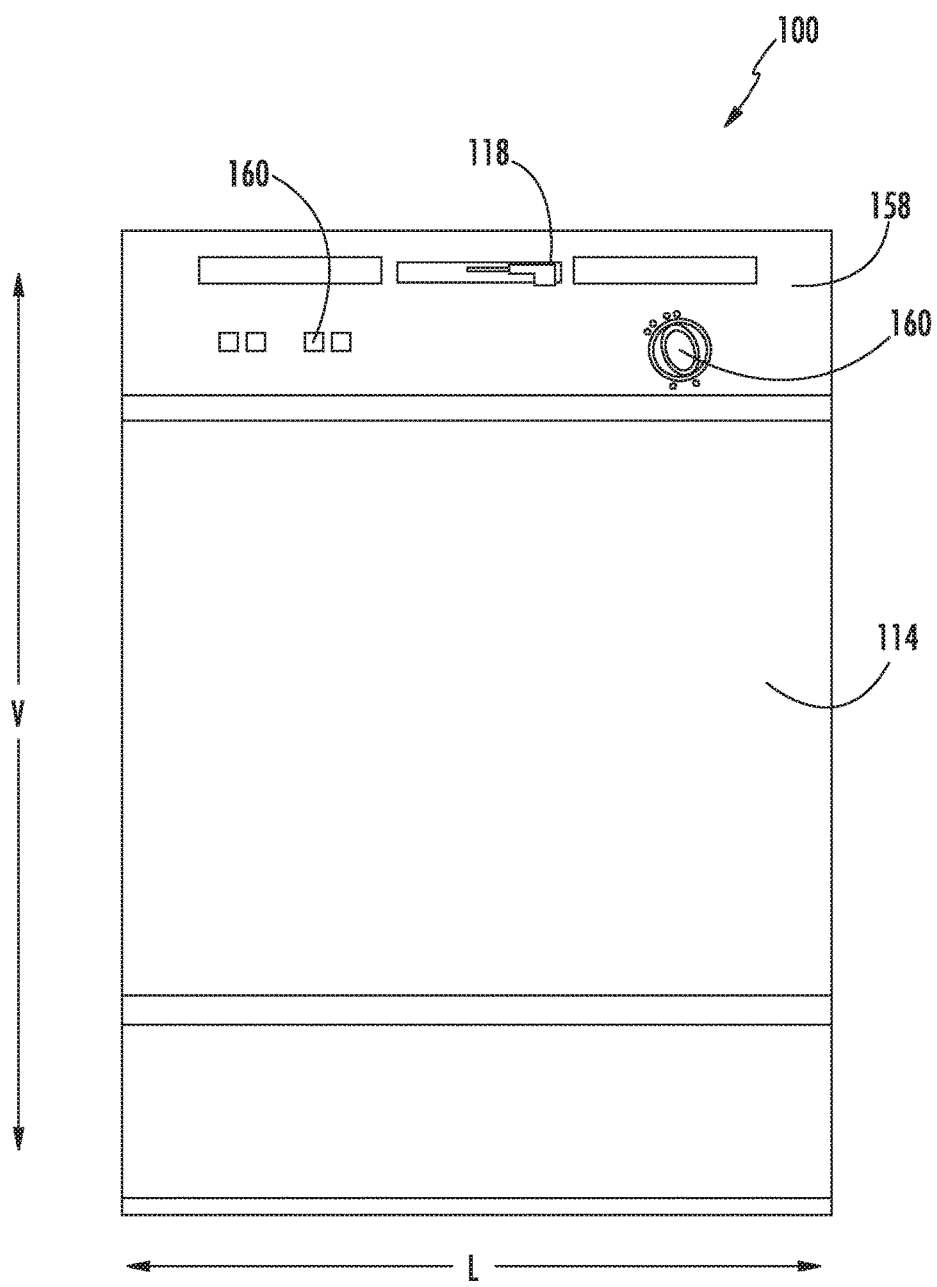
FIG. 1 provides a front view of a dishwasher appliance which may include embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "article" may refer to, but need not be limited to dishes, pots, pans, silverware, and other cooking utensils and items that can be cleaned in a dishwashing appliance. The term "wash cycle" is intended to refer to one or more periods of time during which a dishwashing appliance operates while containing the articles to be washed and uses a detergent and water, preferably with agitation, to, e.g., remove soil particles including food and other undesirable elements from the articles. The term "rinse cycle" is intended to refer to one or more periods of time during which the dishwashing appliance operates to remove residual soil, detergents, and other undesirable elements that were retained by the articles after completion of the wash cycle. The term "wash fluid" refers to a liquid used for washing and/or rinsing the articles and is typically made up of water that may include other additives such as detergent or other treatments.

Figure 2:
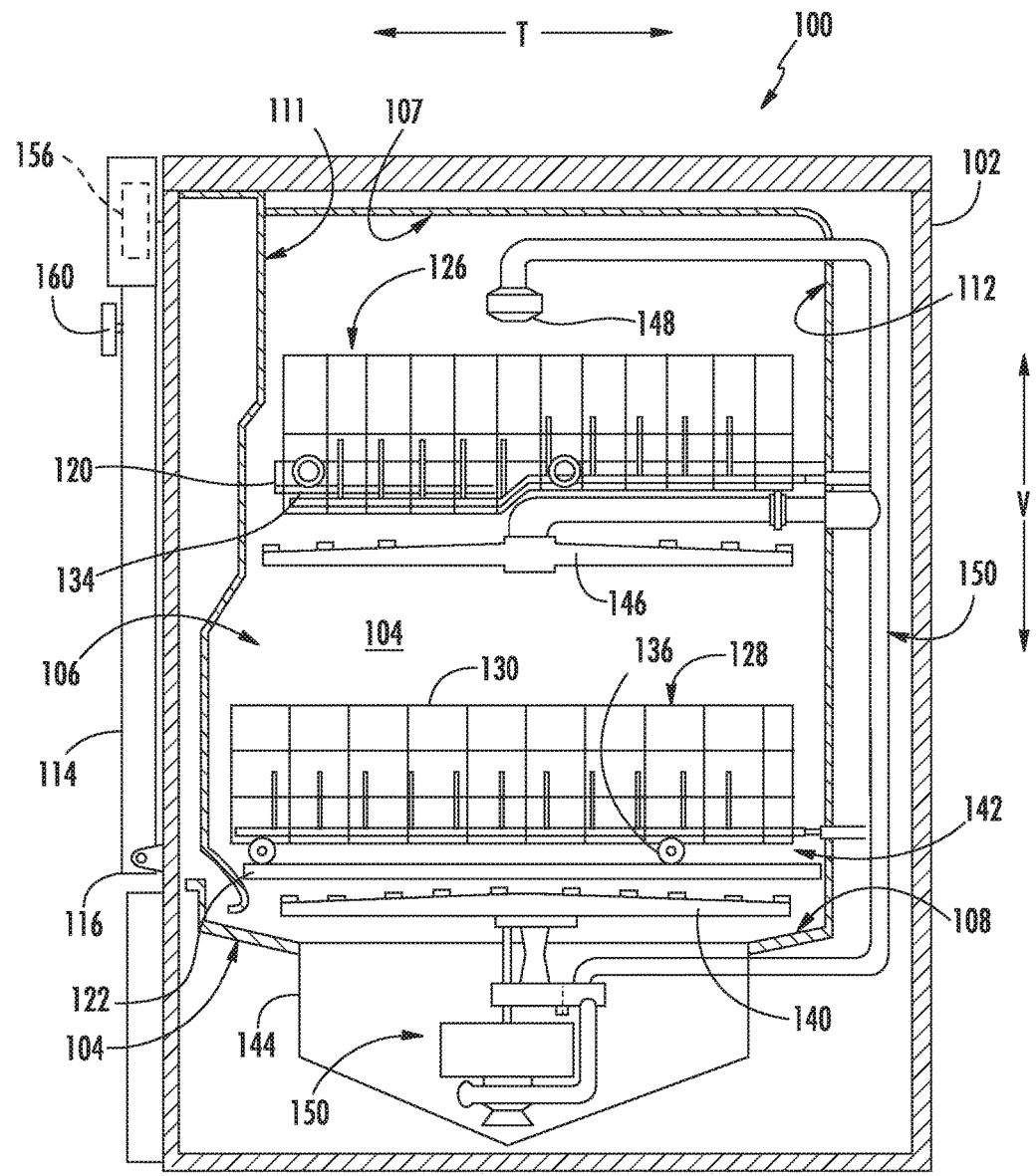
FIG. 2 provides a section view of the dishwasher appliance of FIG. 1.

FIGS. 1 and 2 depict an exemplary domestic dishwasher or dishwashing appliance 100 that may be configured in accordance with aspects of the present disclosure. For the particular embodiment of FIGS. 1 and 2, the dishwasher 100 includes a cabinet 102 having a tub 104 therein that defines a wash chamber 106. As shown in FIG. 2, the tub extends between a top 107 and a bottom 108 along a vertical direction V, between a first side and a second side along a lateral direction L, and between a front side 111 and a rear side 112 along a transverse direction T. Each of the vertical direction V, lateral direction L, and transverse direction T are mutually perpendicular to one another. The tub 104 includes a front opening (not shown) and a door 114 hinged at its bottom 116 for movement between a normally closed vertical position (shown in FIGS. 1 and 2), wherein the wash chamber 106 is sealed shut for washing operation, and a horizontal open position for loading and unloading of articles from the dishwasher 100. Latch 118 is used to lock and unlock door 114 for access to wash chamber 106.

Upper and lower guide rails 120, 122 are mounted on the first and second sides of tub 104 and accommodate roller-equipped rack assemblies 126 and 128. Each of the rack assemblies 126, 128 is fabricated into lattice structures including a plurality of elongated members 130 (for clarity of illustration, not all elongated members making up assemblies 126 and 128 are shown in FIG. 2). Each rack 126, 128 is adapted for movement between an extended loading position (not shown) in which the rack is substantially positioned outside the wash chamber 106, and a retracted position (shown in FIGS. 1 and 2) in which the rack is located inside the wash chamber 106. This is facilitated by rollers 134 and 136, for example, mounted onto racks 126 and 128, respectively. A silverware basket (not shown) may be removably attached to rack assembly 128 for placement of silverware, utensils, and the like, that are otherwise too small to be accommodated by racks 126, 128.

The dishwasher 100 further includes a lower spray arm assembly 140 that will be described in more detail below. Lower spray arm assembly 140 may be disposed in a lower region 142 of the wash chamber 106 and above a tub sump portion 144 so as to rotate in relatively close proximity to rack assembly 128. A mid-level spray arm assembly 146 is located in an upper region of the wash chamber 106 and may be located in close proximity to upper rack 126. Additionally, an upper spray assembly 148 may be located above the upper rack 126. As will be described in detail below, spray arm assemblies 140, 146, 148 may be part of a fluid circulation assembly 150 for circulating water and dishwasher fluid in the tub 104.

Each spray arm assembly 140, 146, 148 includes an arrangement of discharge ports or orifices for directing washing liquid received from fluid circulation assembly 150 onto dishes or other articles located in rack assemblies 126 and 128. The arrangement of the discharge ports, also referred to as jets, apertures, or orifices, may provide a rotational force by virtue of washing fluid flowing through the discharge ports. Alternatively, spray arm assemblies 140, 146, 148 may be motor-driven. The resultant movement of the spray arm assemblies 140, 146, 148 provides coverage of dishes and other dishwasher contents with a washing spray. Other configurations of spray assemblies may be used as well. For example, dishwasher 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only, and are not limitations of the present subject matter.

The dishwasher 100 is further equipped with a controller 156 to regulate operation of the dishwasher 100. The controller 156 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 156 may be positioned in a variety of locations throughout dishwasher 100. In the illustrated embodiment, the controller 156 may be located within a control panel area 158 of door 114 as shown in FIGS. 1 and 2. In such an embodiment, input/output ("I/O") signals may be routed between the control system and various operational components of dishwasher 100 along wiring harnesses that may be routed through the bottom 116 of door 114. Typically, the controller 156 includes a user interface panel/controls 160 through which a user may select various operational features and modes and monitor progress of the dishwasher 100. In one embodiment, the user interface 160 may represent a general purpose I/O ("GPIO") device or functional block. In one embodiment, the user interface 160 may include input components, such as one or more of a variety of electrical, mechanical or electro-mechanical input devices including rotary dials, push buttons, and touch pads. The user interface 160 may include a display component, such as a digital or analog display device designed to provide operational feedback to a user. The user interface 160 may be in communication with the controller 156 via one or more signal lines or shared communication busses.

It should be appreciated that the invention is not limited to any particular style, model, or configuration of dishwasher 100. The exemplary embodiment depicted in FIGS. 1 and 2 is for illustrative purposes only. For example, different locations may be provided for user interface 160, different configurations may be provided for racks 126, 128, different spray arm assemblies 140, 146, 148 may be used, and other differences may be applied as well.

Figure 3:
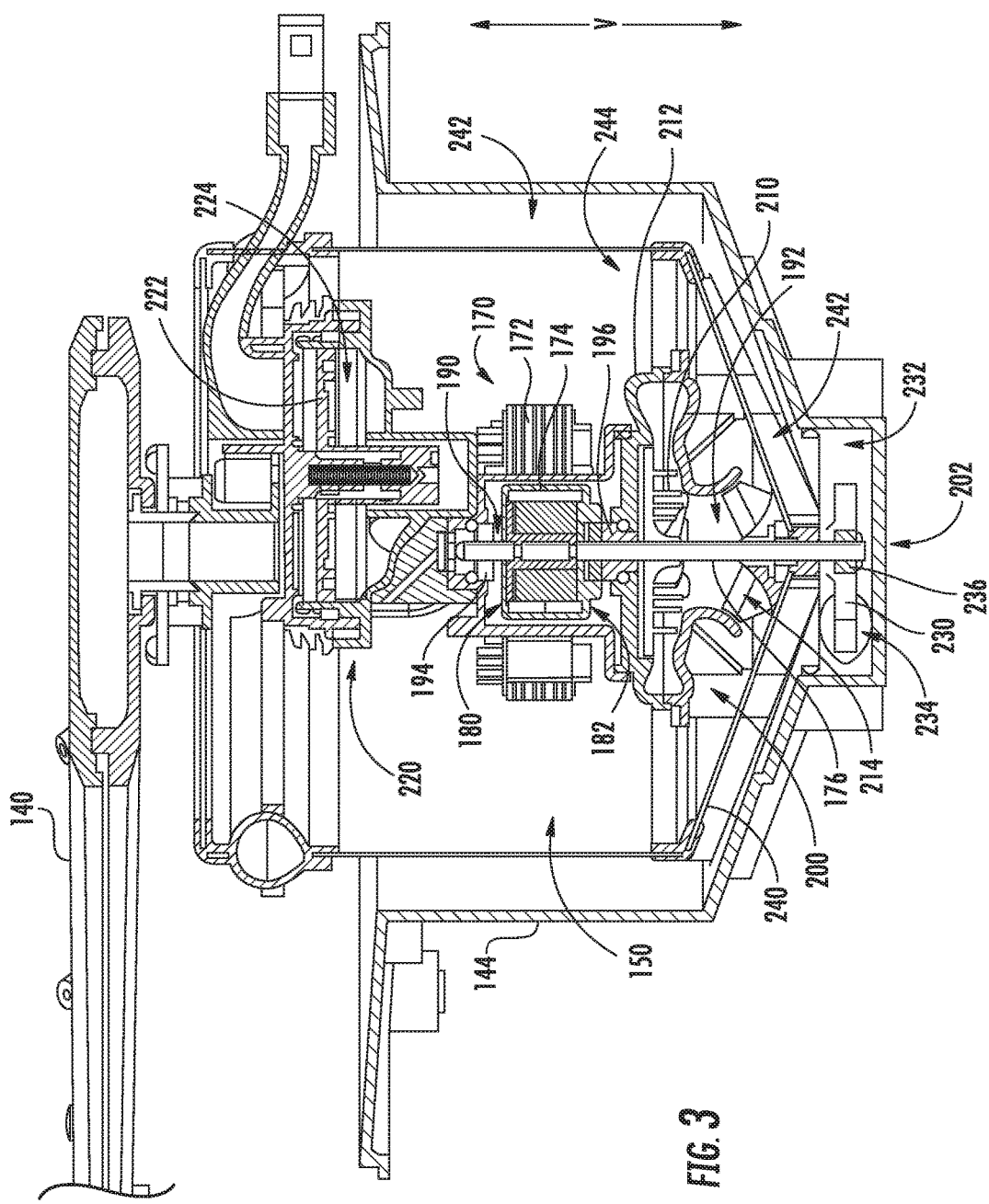
FIG. 3 provides a section view of a fluid circulation assembly according to embodiments of the present disclosure.

Referring now generally to FIGS. 3 through 10, a fluid circulation assembly 150 according to an example embodiment of the present subject matter will be described. Fluid circulation assembly 150 may include a drive motor 170 that may be disposed within sump portion 144 of tub 104 and may be configured to rotate multiple components of dishwasher 100. As best shown in FIG. 3, drive motor 170 may be, for example, a brushless DC motor having a stator 172, a rotor 174, and a drive shaft 176 attached to rotor 174. A controller or control board (not shown) may control the speed of motor 170 and rotation of drive shaft 176 by selectively applying electric current to stator 172 to cause rotor 174 and drive shaft 176 to rotate. Although drive motor 170 is illustrated herein as a brushless DC motor, it should be appreciated that any suitable motor may be used while remaining within the scope of the present subject matter. For example, according to alternative embodiments, drive motor 170 may instead be a synchronous induction motor.

According to an exemplary embodiment, drive motor 170 and all its components may be potted. In this manner, drive motor 170 may be shock-resistant, submersible, and generally more reliable. Notably, because drive motor 170 is mounted inside wash chamber 106 and is completely submersible, no seals are required and the likelihood of leaks is reduced. In addition, because drive motor 170 is mounted in the normally unused space between lower spray arm 140 and a bottom wall of sump portion 144, instead of beneath the sump portion 144, this design is inherently more compact than conventional designs.

Figure 4:
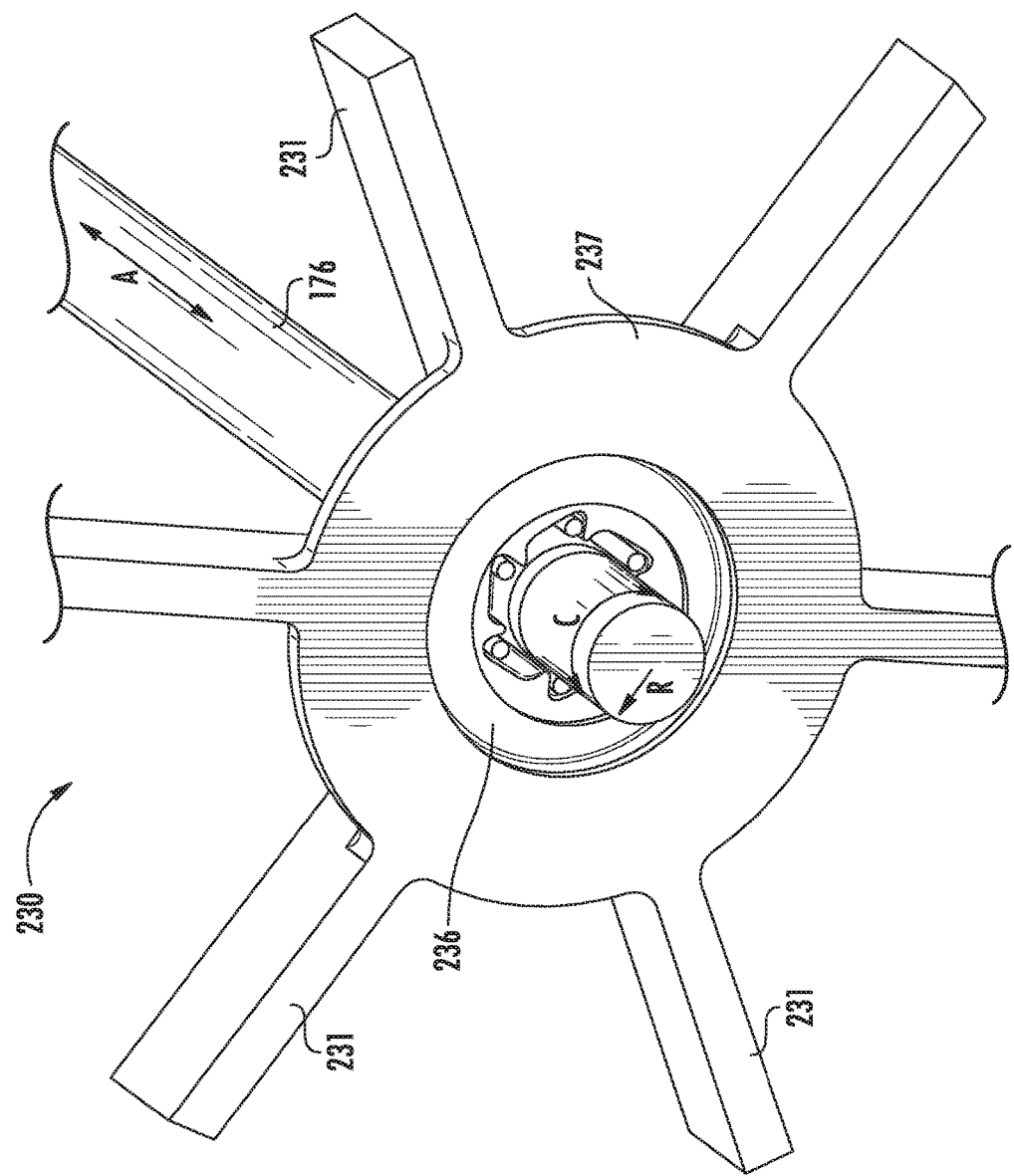
FIG. 4 provides a perspective view of a portion of the fluid circulation assembly of FIG. 3.

According to an exemplary embodiment, fluid circulation assembly 150 may be vertically mounted within sump portion 144 of wash chamber 106. More particularly, drive motor 170 of fluid circulation assembly 150 may be mounted such that drive shaft 176 is oriented along vertical direction V (FIG. 2) of dishwasher 100. More particularly, as indicated in FIG. 4, drive shaft 176 may define an axial direction A, a radial direction R, and a circumferential direction C. The axial direction A may be parallel to the vertical direction V of the dishwasher 100, with the radial direction R perpendicular to the axial direction A and the circumferential direction C extending around the axial direction A. So oriented, drive motor 170 may include a top side 180 facing top 107 of tub 104 and a bottom side 182 facing bottom 108 of tub 104.

As best shown in FIG. 3 and described below, rotatable drive shaft 176 may extend out of both top side 180 and bottom side 182 of drive motor 170. More particularly, a top portion 190 of drive shaft 176 may extend out of top side 180 of motor 170 toward top 107 of tub 104 and a bottom portion 192 of drive shaft 176 may extend along the axial direction A out of bottom side 182 of motor 170 toward bottom 108 of tub 104. Notably, top portion 190 and bottom portion 192 may be part of the same, continuous, straight drive shaft 176 and thus rotate at the same speed.

Referring still to FIG. 3, drive shaft 176 is rotatably supported by an upper bearing 194 and a lower bearing 196. As illustrated, upper bearing 194 is positioned at and operably coupled with top portion 190 of drive shaft 176 and lower bearing 196 is positioned at and operably coupled with bottom portion 192 of drive shaft 176. As illustrated, bearings 194, 196 are graphite sleeve bearings. However, it should be appreciated that any suitable bearing may be used while remaining within the scope of the present subject matter. For example, bearings 194, 196 may be any suitable combination of roller bearings, ball bearings, thrust bearings, bush bearings, etc.

As illustrated in FIG. 3, fluid circulation assembly 150 further includes a filter 240. In general, filter 240 may define an unfiltered region 242 and a filtered region 244 within sump portion 144. During a wash or rinse cycle, wash fluid sprayed on dishes or other articles within wash chamber 106 falls into the unfiltered region 242. Wash fluid passes through filter 240 which removes food particles, resulting in relatively clean wash fluid within filtered region 244. As used herein, "food particles" refers to food soil, particles, sediment, or other contaminants in the wash fluid which are not intended to travel through filter 240. Thus, a food particle seal may allow water or other wash fluids to pass from the unfiltered region 242 to the filtered region 244 while preventing food particles entrained within that wash fluid from passing along with the wash fluid.

As illustrated, filter 240 is a cylindrical and conical fine mesh filter constructed from a perforated stainless steel plate. Filter 240 may include a plurality of perforated holes, e.g., approximately $15/1000$ of an inch in diameter, such that wash fluid may pass through filter 240, but food particles entrained in the wash fluid do not pass through filter 240. However, according to alternative embodiments, filter 240 may be any structure suitable for filtering food particles from wash fluid passing through filter 240. For example, filter 240 may be constructed from any suitably rigid material, may be formed into any suitable shape, and may include apertures of any suitable size for capturing particulates.

Still referring to FIG. 3, bottom portion 192 of drive shaft 176 is configured for driving a circulation or wash pump assembly 200 and a drain pump assembly 202. The wash pump assembly 200 and the drain pump assembly 202 may each be coupled to the bottom portion 192 of drive shaft 176, e.g., with the wash pump assembly 200 above the drain pump assembly 202 and below the motor 170 along the vertical direction V. Wash pump assembly 200 may generally be configured for circulating wash fluid within wash chamber 106 during wash and/or rinse cycles. Drain pump assembly 202 may generally be configured for periodically discharging soiled wash from dishwasher 100. Each of these assemblies will be described in more detail below.

According to an exemplary embodiment, wash pump assembly 200 may be configured to provide wash fluid to spray arm assemblies 140, 146, 148. More specifically, wash pump assembly 200 may include a wash pump impeller 210 disposed on bottom portion 192 of drive shaft 176 within a pump housing 212. Pump housing 212 defines a pump intake 214 for drawing wash fluid into wash pump impeller 210. According to the illustrated embodiment, pump intake 214 is facing downward along the vertical direction V and is located very near the bottom of sump portion 144. In this manner, the amount of water required to prime and operate wash pump assembly 200 is minimized. This is particularly advantageous when running low water cycles for the purpose of water and energy savings.

In operation, wash pump impeller 210 draws wash fluid in from sump portion 144 and pumps it to a diverter assembly 220. Diverter assembly 220 may include a diverter disc 222 disposed within a diverter chamber 224 for selectively distributing the wash fluid to the spray arm assemblies 140, 146, 148. More particularly, diverter disc 222 may be rotatably mounted about the vertical direction V. Diverter disc 222 may have a plurality of apertures that are configured to align with one or more outlet ports at the top of diverter chamber 224.

In addition, drain pump assembly 200 may be configured for discharging soiled wash fluid from the dishwasher 100 periodically. More specifically, drain pump assembly 202 may include a drain pump impeller 230 disposed on bottom portion 192 of drive shaft 176 below the wash pump impeller 210 and within a drain pump volute 232. Drain pump volute 232 is positioned at the very bottom of sump portion 144, such that wash fluid collects within drain pump volute 232. During a drain cycle, drain pump impeller 230 is rotated and soiled wash fluid is discharged from dishwasher 100 through a discharge conduit 234. After some or all of the soiled wash fluid is discharged, fresh water and/or wash additives may be added and the wash or rinse cycle may be repeated. Notably, drain pump impeller 230 is coupled to bottom portion 192 of drive shaft 176 using a one-way clutch 236. In this regard, during a wash pump mode, drive motor 170 rotates in one direction, e.g., a first direction, pumping filtered wash fluid using wash pump impeller 210. However, when drive shaft 176 rotates in the first direction, one-way clutch 236 is disengaged, so drain pump impeller 230 does not rotate. By contrast, during a drain pump mode, drive motor 170 rotates in the opposite direction, e.g., a second direction opposing the first direction, thereby engaging one-way clutch 236 and causing drain pump impeller 230 to rotate and discharge wash fluid.

Additionally, the wash pump impeller 210 may be configured such that it is more efficient in the first direction of rotation than in the second direction of rotation. For example, as is generally understood in the art, the wash pump impeller 210 may include blades (not shown), and the blades may have a cross-sectional profile and may define an angle with respect to the vertical direction V. Thus, the wash pump impeller 210 may be configured such that the profile and angle of the blades make it more efficient in the first direction of rotation than in the second direction of rotation. The general principles of impeller blade design are understood by those of ordinary skill in the art and are not discussed in greater detail herein.

Figure 5:
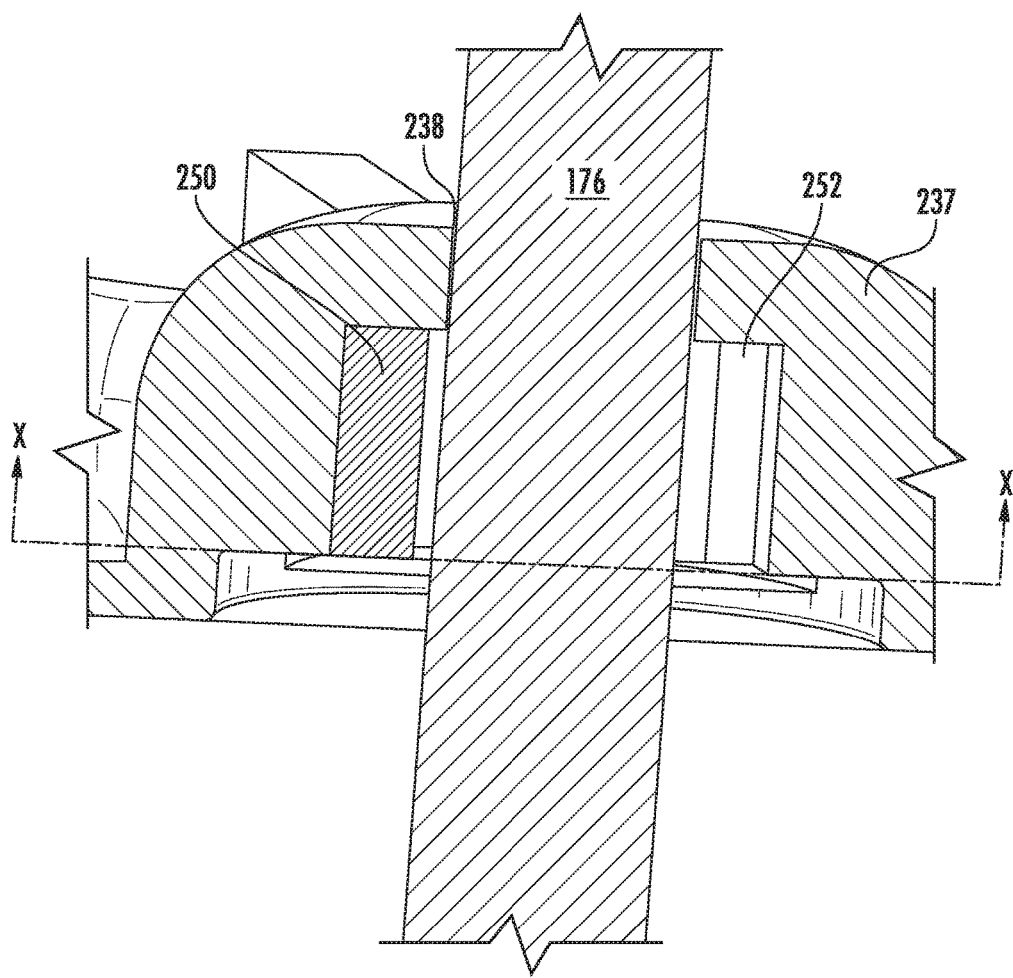
FIG. 5 provides a section view of the portion of the fluid circulation assembly of FIG. 4.

As may be seen in FIG. 4, the drain pump impeller 230 may include a central hub 237 and a plurality of impeller blades 231 extending outwardly from the central hub 237 along the radial direction R. Further, the one-way clutch 236 may be integrally formed with the drain pump impeller 230. As illustrated in FIG. 5, the one-way clutch 236 includes a housing 252 and a bearing 250 disposed within the housing 252, and the housing 252 of the one-way clutch 236 is integrally formed in the central hub 237 of the drain impeller 230. As may be seen in FIGS. 4, 6, 7, and 11, in various embodiments, the one-way clutch 236 may include a plurality of housings 252 arranged around the drive shaft 176 along the circumferential direction C, and each housing 252 of the plurality of housings 252 has a bearing 250 disposed therein. Any suitable number of housings 252, each having an associated bearing 250, may be provided.

Figure 6:
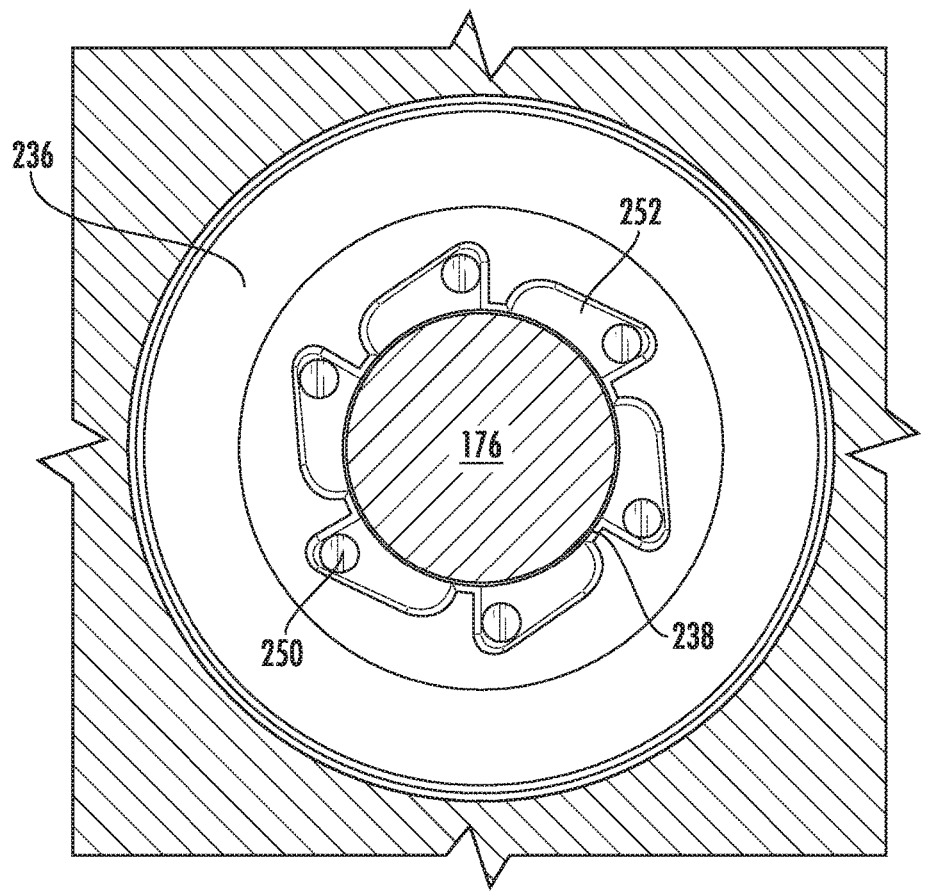
FIG. 6 provides a section view taken along line X-X in FIG. 5.
Figure 7:
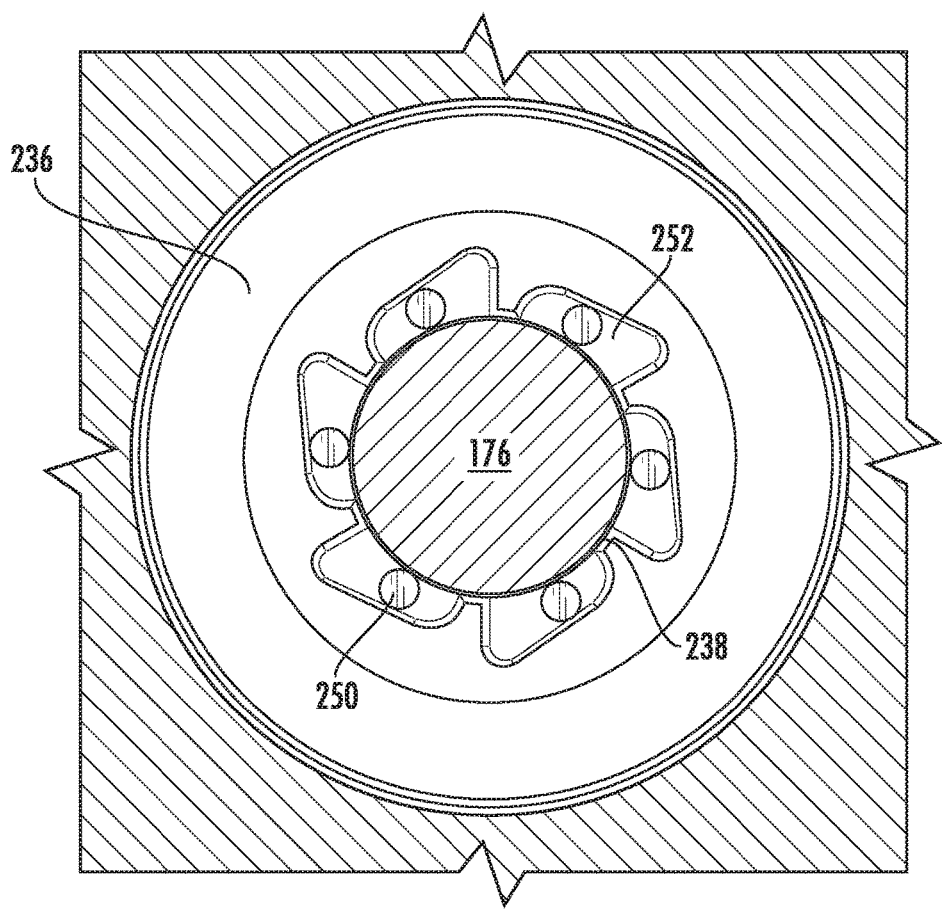
FIG. 7 provides a similar view as FIG. 6, wherein bearings are in a second position.

As illustrated in FIGS. 6 and 7, the bearing 250 is movable within the housing 252 between a first position (FIG. 6) and a second position (FIG. 7). Further, as may be seen in FIGS. 8 and 9, the bearing 250 is spaced from the drive shaft 176 in the first position (FIG. 8), and the bearing 250 operatively engages the housing 252 and the drive shaft 176 to transfer rotational motion from the drive shaft 176 to the drain pump impeller 230 in the second position (FIG. 9). Notably, the one-way clutch 236 does not include a spring for moving the bearing 250 between the first position and the second position. Rather, hydrodynamic forces created by the rotation of drive shaft 176 urge the bearing 250 to move to the first position when the drive shaft 176 rotates in the first direction. Thus, when drive shaft 176 rotates in the first direction, the bearing 250 disengages the drive shaft 176 and the drain pump impeller 230 such that the drive shaft 176 rotates freely within the drain impeller 230. Similarly, when the drive shaft 176 rotates in the second direction, the bearing 250 is urged by the hydrodynamic forces to move to the second position wherein the bearing 250 may engage the drive shaft 176 and the drain pump impeller 230 to transfer rotational movement from the drive shaft 176 to the drain pump impeller 230.

Referring again to FIGS. 5 through 7, in some embodiments, the drain pump impeller 230 may have a generally cylindrical central bore 238 extending along the axial direction A. In such embodiments, the housing 252 may include a first wall 254 (FIGS. 8 through 11) extending along the radial direction R and a second wall 256 (FIGS. 8 through 11) oblique to the first wall 254. Further in such embodiments, the housing 252 may be open to the central bore 238 on one side. For example, as may be seen in FIG. 9, the bearing 250 is radially constrained by the housing 252, and in particular second wall 256, on one side, and by the drive shaft 176 on the other side, e.g., the side at which the housing 252 is open to the central bore 238. Also as may be seen in FIGS. 8 and 9, bearing 250 moves radially inward, guided by second wall 256, as the bearing 250 moves from the first position of FIG. 8 to the second position of FIG. 9. Accordingly, as the bearing 250 moves radially inward within the housing 252, it moves toward the open side of the housing and into engagement with the drive shaft 176.

First wall 254 may extend from central bore 238 along the radial direction R by more than a width (e.g., diameter) of bearing 250 along the radial direction R, e.g., such that bearing 250 does not contact drive shaft 176 at the first position, e.g., when positioned at an interface between first wall 254 and second wall 256. Second wall 256 may extend from first wall 254 inwardly along the radial direction R towards central bore 238 such that second wall 256 tapers inwardly along the radial direction R from first wall 254. Thus, bearing 250 may extend between drive shaft 176 and second wall 256 at the second position, and bearing 250 may be wedged between drive shaft 176 and second wall 254 due to the tapering of second wall 256.

Figure 8:
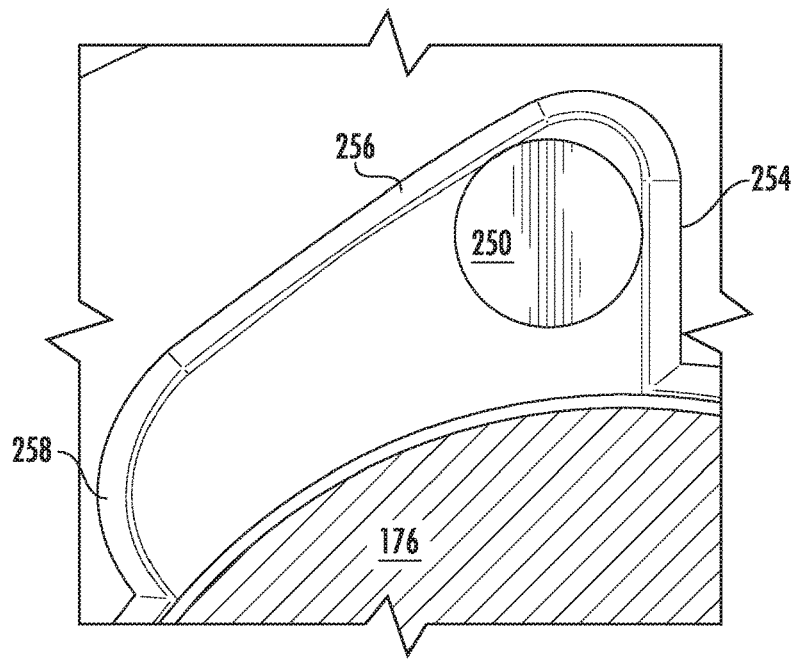
FIG. 8 provides an enlarged view of a portion of FIG. 6.
Figure 9:
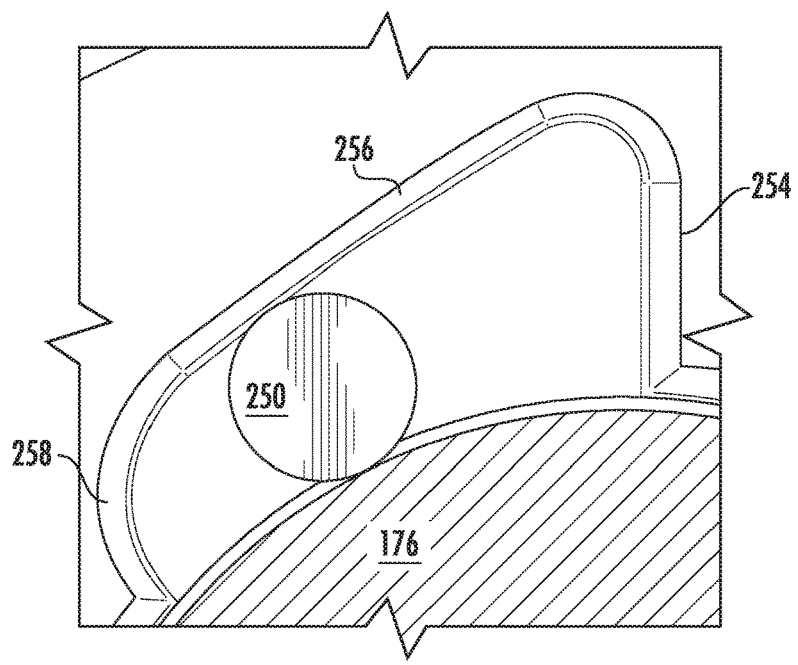
FIG. 9 provides an enlarged view of a portion of FIG. 7.
Figure 10:
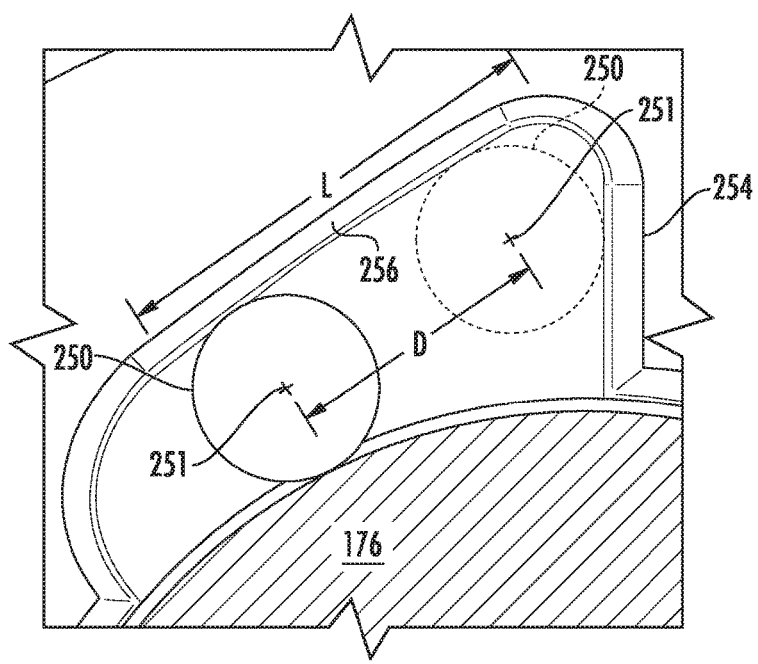
FIG. 10 provides a similar view as FIGS. 8 and 9.

In some embodiments, as illustrated in FIGS. 8 and 9, the housing may further include a third wall 258. Notably, the third wall 258 does not limit the travel of the bearing 250. For example, as may be seen in FIG. 9, the bearing 250 does not contact third wall 258 when the bearing 250 is in the second position. Rather, the bearing 250 is engaged only by the second wall 256 and the shaft 176. As illustrated in FIG. 10, the second wall 256 defines a length L, and the bearing 250 travels a distance D as it moves from the first position to the second position. The distance D may be measured with respect to any consistent reference point on the bearing 250, such as the center point 251. Still with reference to FIG. 10, the length L of the second wall 256 is greater than the distance D between the first position of the bearing 250 and the second position of the bearing 250. Accordingly, the bearing 250 will engage the drive shaft 176 without travelling the full circumferential extent of the housing 252 and without engaging third wall 258.

Figure 11:
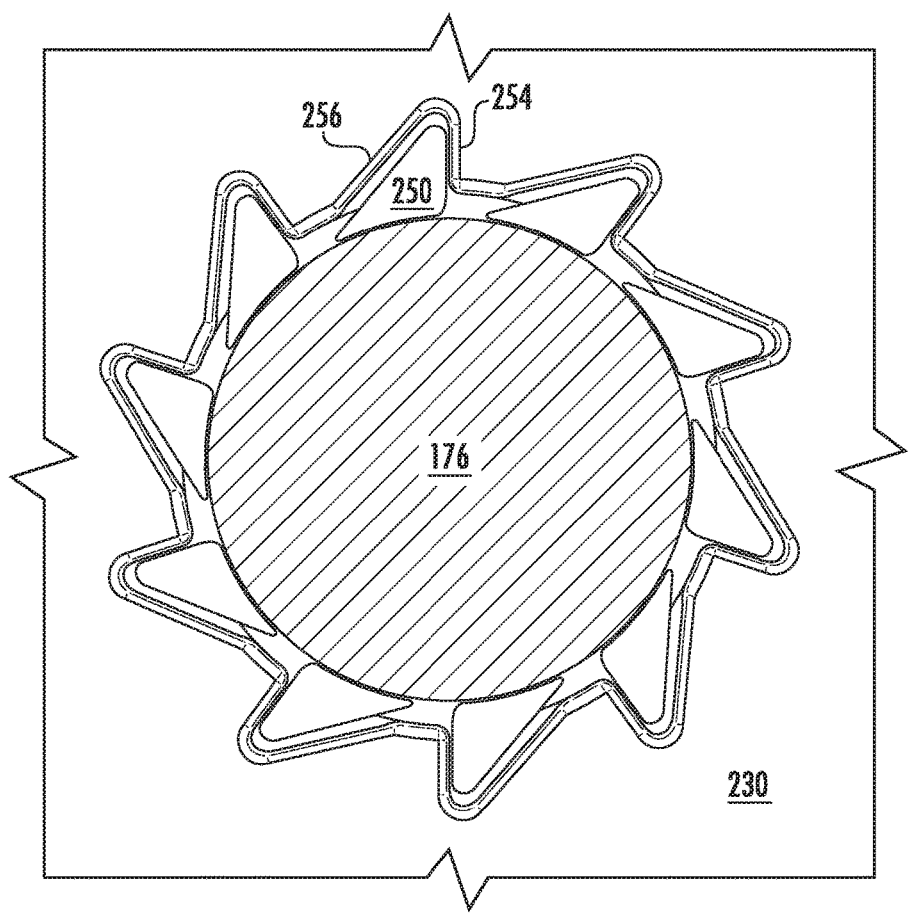
FIG. 11 provides a section view according to further embodiments of the present disclosure.

In some embodiments, the bearings 250 may have a polygonal cross section. For example, as illustrated in FIG. 11, the bearings 250 may have a generally triangular, wedge-shaped cross-section. Similarly, the housings 252 in some embodiments such as the example embodiment illustrated in FIG. 11, may include three sides and may be enclosed by walls 254, 256 on two sides and open on the third side. In various embodiments, the bearings may be prismatic or may have a variable cross section along the axial direction A. For example, the bearings 250 may have a circular cross section and may be cylindrical, such as the example embodiment illustrated in FIG. 4.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fluid circulation assembly, comprising:
    a motor;
    a drive shaft rotatably coupled to the motor, the drive shaft defining an axial direction, a radial direction, and a circumferential direction, the drive shaft extending along the axial direction out of the motor; and
    an impeller comprising a central hub and a plurality of impeller blades extending outwardly from the central hub along the radial direction, the impeller coupled to the drive shaft with a one-way clutch, the one-way clutch comprising a housing formed of a unitary and seamless construction with the central hub and a bearing disposed within the housing, the housing including a first wall extending along the radial direction and a second wall oblique to the first wall, a width of the bearing along the radial direction is less than a length of the first wall along the radial direction, the bearing configured to move within the housing between a first position and a second position, the bearing radially spaced from the drive shaft in the first position, the second wall extending from the first wall inwardly along the radial direction and configured to guide the bearing radially inward from the first position to the second position, the bearing operatively engaging the second wall of the housing and the drive shaft to transfer rotational motion from the drive shaft to the impeller in the second position;
    wherein the bearing is configured to move to the first position to disengage the drive shaft and the impeller such that the drive shaft rotates freely within the impeller when the drive shaft rotates in a first direction and the bearing is configured to move to the second position to engage the drive shaft and the impeller to transfer rotational movement from the drive shaft to the impeller when the drive shaft rotates in a second direction opposing the first direction.

2. The fluid circulation assembly of claim 1, wherein the one-way clutch does not include a spring for moving the bearing between the first position and the second position.

3. The fluid circulation assembly of claim 1, wherein the impeller has a generally cylindrical central bore extending along the axial direction and the housing is open to the central bore on one side.

4. The fluid circulation assembly of claim 1, wherein the second wall defines a length, the length of the second wall is greater than the distance between the first position of the bearing and the second position of the bearing.

5. The fluid circulation assembly of claim 1, wherein the impeller is a drain pump impeller, and the fluid circulation assembly further comprises a wash pump impeller coupled to the drive shaft between the drain pump impeller and the motor along the axial direction.

6. The fluid circulation assembly of claim 1, wherein the impeller has a generally cylindrical central bore extending along the axial direction, and the housing is enclosed on at least two sides and opens to the central bore on another side.

7. The fluid circulation assembly of claim 1, wherein the one-way clutch comprises a plurality of housings arranged around the drive shaft along the circumferential direction, each housing of the plurality of housings having a bearing disposed therein.

8. The fluid circulation assembly of claim 1, wherein the bearing is cylindrical.

9. The fluid circulation assembly of claim 1, wherein the bearing has a polygonal cross section.

10. The fluid circulation assembly of claim 9, wherein the bearing is prismatic.

11. A dishwasher appliance defining a vertical direction, a lateral direction, and a transverse direction that are mutually perpendicular, the dishwasher appliance comprising:
    a tub defining a wash chamber for receipt of articles for washing;
    a sump positioned at a bottom of the wash chamber for receiving fluid from the wash chamber;
    a filter at least partially disposed within the sump; and
    a fluid circulation assembly disposed within the sump and surrounded by the filter, the fluid circulation assembly comprising:
        a motor;
        a drive shaft rotatably coupled to the motor, the drive shaft defining an axial direction, a radial direction, and a circumferential direction, the drive shaft extending along the axial direction out of the motor;
        an impeller comprising a central hub and a plurality of impeller blades extending outwardly from the central hub along the radial direction, the impeller coupled to the drive shaft with a one-way clutch, the one-way clutch comprising a housing formed of a unitary and seamless construction with the central hub and a bearing disposed within the housing, the housing including a first wall extending along the radial direction and a second wall oblique to the first wall, a width of the bearing along the radial direction is less than a length of the first wall along the radial direction, the bearing configured to move within the housing between a first position and a second position, the bearing radially spaced from the drive shaft in the first position, the second wall extending from the first wall inwardly along the radial direction and configured to guide the bearing radially inward from the first position to the second position, the bearing operatively engaging the second wall of the housing and the drive shaft to transfer rotational motion from the drive shaft to the impeller in the second position;
wherein the bearing is configured to move to the first position to disengage the drive shaft and the impeller such that the drive shaft rotates freely within the impeller when the drive shaft rotates in a first direction and the bearing is configured to move to the second position to engage the drive shaft and the impeller to transfer rotational movement from the drive shaft to the impeller when the drive shaft rotates in a second direction opposing the first direction.

12. The dishwasher appliance of claim 11, wherein the one-way clutch does not include a spring for moving the bearing between the first position and the second position.

13. The dishwasher appliance of claim 11, wherein the impeller has a generally cylindrical central bore extending along the axial direction and is open to the central bore on one side.

14. The dishwasher appliance of claim 11, wherein the second wall defines a length, the length of the second wall is greater than the distance between the first position of the bearing and the second position of the bearing.

15. The dishwasher appliance of claim 11, wherein the impeller is a drain pump impeller and the fluid circulation assembly further comprises a wash pump impeller coupled to the drive shaft between the drain pump impeller and the motor along the axial direction.

16. The dishwasher appliance of claim 11, wherein the impeller has a generally cylindrical central bore extending along the axial direction, and the housing is enclosed on at least two sides and opens to the central bore on another side.

17. The dishwasher appliance of claim 11, wherein the one-way clutch comprises a plurality of housings arranged around the drive shaft along the circumferential direction.

18. The dishwasher appliance of claim 11, wherein the bearing is cylindrical.

19. The dishwasher appliance of claim 11, wherein the bearing has a polygonal cross section.

20. The dishwasher appliance of claim 11, wherein the bearing is prismatic.

* * * * *